US009084117B2

(12) United States Patent
Dimou

(10) Patent No.: US 9,084,117 B2
(45) Date of Patent: Jul. 14, 2015

(54) DYNAMIC MOBILITY MANAGEMENT IN CELL-BREATHING BASE STATIONS IN A CELLULAR TELECOMMUNICATION NETWORK

(75) Inventor: Konstantinos Dimou, San Francisco, CA (US)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 468 days.

(21) Appl. No.: 13/541,134

(22) Filed: Jul. 3, 2012

(65) Prior Publication Data
US 2014/0011534 A1   Jan. 9, 2014

(51) Int. Cl.
*H04W 52/02* (2009.01)
*H04W 16/08* (2009.01)
*H04W 52/34* (2009.01)
*H04W 72/04* (2009.01)
*H04W 52/14* (2009.01)
*H04W 52/24* (2009.01)

(52) U.S. Cl.
CPC .......... *H04W 16/08* (2013.01); *H04W 52/0206* (2013.01); *H04W 52/343* (2013.01); *H04W 72/0473* (2013.01); *H04W 52/143* (2013.01); *H04W 52/245* (2013.01); *Y02B 60/50* (2013.01)

(58) Field of Classification Search
CPC ... H04L 1/0003; H04L 1/0009; H04L 1/0036; H04L 1/0631; H04L 1/208
USPC .......................................................... 455/522
See application file for complete search history.

(56) References Cited

U.S. PATENT DOCUMENTS

| 6,584,330 | B1 | 6/2003 | Ruuska | |
|---|---|---|---|---|
| 8,880,012 | B2* | 11/2014 | Goedken et al. | 455/127.2 |
| 8,892,176 | B2* | 11/2014 | Kim et al. | 455/574 |
| 8,897,842 | B2* | 11/2014 | Kim et al. | 455/574 |
| 2006/0215592 | A1* | 9/2006 | Tomoe et al. | 370/315 |
| 2006/0276216 | A1 | 12/2006 | Tongen | |
| 2007/0243873 | A1 | 10/2007 | Jin et al. | |
| 2009/0180428 | A1 | 7/2009 | Viswanath | |
| 2011/0195741 | A1* | 8/2011 | Kim et al. | 455/522 |
| 2011/0201334 | A1 | 8/2011 | Rosenqvist | |

FOREIGN PATENT DOCUMENTS

| EP | 2107847 A1 | 10/2009 |
|---|---|---|
| WO | 2010/145336 A1 | 12/2010 |
| WO | 2011/064696 A1 | 6/2011 |
| WO | 2011/098338 A1 | 8/2011 |
| WO | 2011/147450 A1 | 12/2011 |

* cited by examiner

*Primary Examiner* — Bobbak Safaipour

(57) ABSTRACT

In a cellular communication network, a method of dynamic mobility management in which a base station employing cell-breathing or other similar energy-efficiency mechanism notifies User Equipments (UEs) in its cell, either via broadcasting or with direct over-the-air signaling, that such a mechanism is utilized within the cell. The base station may also notify neighbor base stations of its use of cell-breathing. The neighbor base stations disseminate this information to UEs within their own cells, and consider this information when deciding whether to hand over a UE to a base station that is capable of performing cell-breathing. The base station may also inform UEs in the cell and/or neighbor base stations when it is preparing to reduce transmission power. UEs store information regarding which base stations use cell-breathing, and consider this information when performing cell reselections.

21 Claims, 5 Drawing Sheets

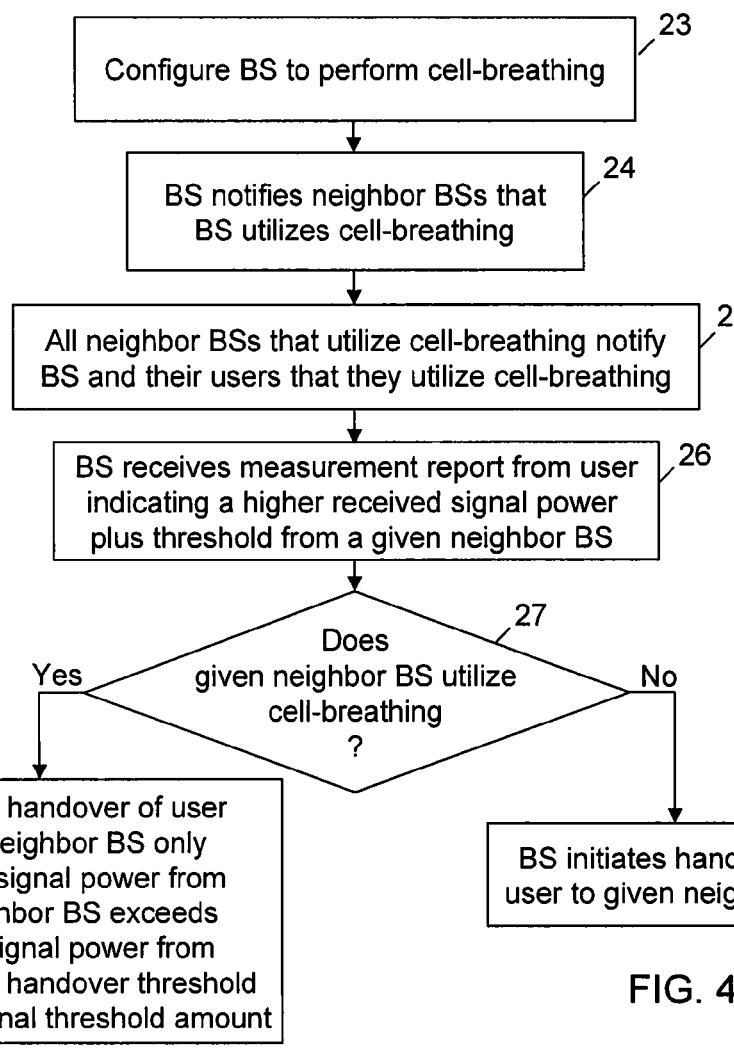

DYNAMIC MOBILITY MANAGEMENT IN CELL-BREATHING BASE STATIONS IN A CELLULAR TELECOMMUNICATION NETWORK

STATEMENT REGARDING FEDERALLY SPONSORED RESEARCH OR DEVELOPMENT

NOT APPLICABLE

REFERENCE TO SEQUENCE LISTING, A TABLE, OR A COMPUTER PROGRAM LISTING COMPACT DISC APPENDIX

NOT APPLICABLE

TECHNICAL FIELD

The present invention relates to cellular telecommunication systems. More particularly, and not by way of limitation, the present invention is directed to an apparatus and method for dynamic mobility management in base stations employing energy efficiency mechanisms such as cell-breathing.

BACKGROUND

Base stations today are known to employ energy-efficiency mechanisms that increase the energy efficiency of the entire network. One of these energy efficiency mechanisms is referred to as "cell-breathing". When utilizing cell-breathing, a base station controls the coverage area of its associated cell to expand or shrink the coverage area as required due to the traffic load in the cell and in neighbor cell(s). When the traffic load in the cell begins to exceed the capacity of the base station, the base station may reduce its transmitter power to force User Equipments (UEs) operating near the cell border to handoff to neighboring cells, thus reducing the load on the base station. This effectively reduces the size of the cell. Conversely, when the traffic load decreases, the base station may increase its transmitter power, thus enabling additional UEs outside the cell border to operate within the cell and effectively increasing the size of the cell. An example of a cell-breathing algorithm is disclosed in the paper by M. Marsan et al, "Optimal Energy Savings in Cellular Access Networks", Proceedings of ICC Workshop 2009, Dresden, June 2009.

In addition to energy management, base stations must also deal with mobility management for the UEs operating within the network. A UE in idle mode may camp or attach to a given cell. If the user, or equivalently the UE, moves to another cell, a cell reselection procedure must be performed. When the UE is active and moves to another cell, a handover procedure must be performed.

Existing mobility management procedures do not take into consideration the energy-efficiency mechanisms that many base stations utilize to maximize their energy efficiency. Mobility management without this input may result in either non-optimal mobility management or non-optimal energy efficiency. For example, a given base station might be switching off its transmitters and receivers for energy reduction reasons when a UE in idle mode tries to attach to the cell controlled by this base station. Alternatively, the UE might be attached to this designated cell when the base station reduces power, and this reduction leaves the UE temporarily or permanently out of coverage. If the UE cannot find another appropriate cell in the vicinity, it may be dropped from the network entirely. Even if the UE is not dropped, the UE has to search for another cell to camp on. This results in higher energy consumption at the UE. It is readily understood, that this results in reduced or degraded service for users in the network.

In another scenario, a given UE may be ready to perform handover from a serving base station to a target base station, which is about to reduce or shut down its transmitters/receivers for the sake of minimizing energy consumption in the network. Within protocols such as 3GPP LTE (Advanced), the serving base station sends a Handover Request message to the target base station via the X2 interface (as described in TS 36.423), requesting whether the target base station can accept the UE. If the target base station is performing a procedure to switch off its transmitters/receivers, the target base station may refuse to accept the UE. This means that a number of pointless signaling messages are exchanged via the X2 interface, resulting in an unnecessary load on this interface.

SUMMARY

Particular embodiments of the present invention provide a solution to the above-mentioned problems. In an exemplary embodiment, base stations employing cell-breathing and similar energy-efficiency mechanisms may notify users in the cell, either via broadcasting or with direct over-the-air signaling, that such a mechanism is utilized within the cell. The base stations may transmit specific transmission patterns (such as Cell-specific Reference Symbols (CRSs) in LTE Advanced), which make these specific transmission patterns traceable in order to identify this characteristic of this particular base station.

In another embodiment, the base stations may notify their neighbor base stations of the use of energy-efficiency mechanisms such as cell-breathing. The neighbor base stations can disseminate this information to UEs within their own cells, and can consider this information when deciding whether to hand over a UE to a base station that uses an energy-efficiency mechanism.

In addition, base stations employing cell-breathing and similar energy-efficiency mechanisms may inform users in the cell and/or neighbor base stations when they are about to reduce power or switch off their transmitters/receivers, or when they are about to reduce certain of their activities. Users in the cell may consider this information when performing cell reselection to neighbor cells or when they listen to CRSs of a neighbor cell with this specific pattern.

Similarly, when a serving base station receives a measurement report from a given UE indicating that a neighbor cell employing a cell-breathing mechanism is the target cell for a requested handover, the serving base station may consider this information when making the handover decision. For example, the serving base station may retain the UE in the serving cell, or may hand over the UE only if the measurement report for the neighbor cell indicates a measured handover-decision criterion such as received signal power from the target base station high enough to make it likely the handover will be successful even if the target base station reduces its transmitter power.

In one embodiment, a base station in a cellular telecommunication network is disclosed. The base station includes a transceiver configured to transmit and receive radio signals with UEs operating in a cell associated with the base station; and a processor coupled to a non-transitory memory that stores computer program instructions, wherein when the processor executes the computer program instructions, the base station is caused to perform a power-efficiency procedure by reducing transmit power of the transceiver when a traffic load in the cell falls below a threshold level; and notify the UEs operating in the cell that the base station is capable of performing the power-efficiency procedure.

In another embodiment, the base station notifies neighbor base stations that the base station is capable of performing the power-efficiency procedure.

In an alternative embodiment, a UE in a cellular telecommunication network is disclosed, wherein the UE is in idle mode and is attached to a first cell served by a first base station. The UE includes a transceiver configured to transmit and receive radio signals with base stations in the cellular telecommunication network; and a processor coupled to a non-transitory memory that stores computer program instructions. When the processor executes the computer program instructions, the UE is caused to perform measurements of a cell reselection criterion from the first base station and from neighbor base stations; determine that a given neighbor base station serving a given neighbor cell has a measured cell reselection criterion higher than the measured cell reselection criterion from the first base station plus a reselection offset amount; and determine whether the given neighbor base station is capable of performing a power-efficiency procedure in which the given neighbor base station reduces a transmit power of its transceiver when a traffic load in the given neighbor cell falls below a threshold level. Upon determining that the given neighbor base station is capable of performing the power-efficiency procedure, the UE performs a cell reselection procedure to attach to the given neighbor cell only if the measured cell reselection criterion from the given neighbor base station exceeds the measured cell reselection criterion from the first base station plus the reselection offset amount plus an additional threshold amount.

In another embodiment, a method performed in a base station in a cellular telecommunication network is disclosed. The base station includes a transceiver configured to transmit and receive radio signals with UEs operating in a cell associated with the base station. The method includes the steps of performing a power-efficiency procedure by reducing transmit power of the transceiver when a traffic load in the cell falls below a threshold level; and notifying the UEs operating in the cell that the base station is capable of performing the power-efficiency procedure.

In another embodiment, a method performed by a UE in Idle mode while attached to a first cell served by a first base station in a cellular telecommunication network is disclosed. The UE performs measurements of a cell reselection criterion from the first base station and from neighbor base stations, and determines that a given neighbor base station serving a given neighbor cell has a measured cell reselection criterion higher than the measured cell reselection criterion from the first base station plus a reselection offset amount. The method includes the steps of receiving from the neighbor base stations, notifications indicating whether each neighbor base station is capable of performing a power-efficiency procedure in which the neighbor base station reduces a transmit power of its transceiver when a traffic load in the neighbor cell falls below a threshold level; storing the notifications in a database; and determining from the database whether the given neighbor base station is capable of performing the power-efficiency procedure. When the given neighbor base station does not perform the power-efficiency procedure, the UE performs a normal cell reselection procedure to attach to the given neighbor cell. When the given neighbor base station is capable of performing the power-efficiency procedure, the UE performs a cell reselection procedure to attach to the given neighbor cell only if the measured cell reselection criterion from the given neighbor base station exceeds the measured cell reselection criterion from the first base station plus the reselection offset amount plus an additional threshold amount.

Particular embodiments of the present invention enables energy-efficiency mechanisms such as cell-breathing to be utilized in a cellular network without adversely impacting mobility management decisions such as cell reselection and handover.

BRIEF DESCRIPTION OF THE DRAWINGS

In the following section, the invention will be described with reference to exemplary embodiments illustrated in the figures, in which:

FIG. 3 is a flow chart illustrating the steps of a third exemplary embodiment of the method of the present invention;

FIG. 4 is a flow chart illustrating the steps of a fourth exemplary embodiment of the method of the present invention;

DETAILED DESCRIPTION

In the following detailed description, numerous specific details are set forth in order to provide a thorough understanding of the invention. However, it will be understood by those skilled in the art that the present invention may be practiced without these specific details. In other instances, well-known methods, procedures, components and circuits have not been described in detail so as not to obscure the present invention. Additionally, it should be understood that particular embodiments of the invention may be implemented as a computer controlled method or apparatus in which a processor coupled to a non-transitory memory executes computer program instructions to cause a base station and/or a UE to perform the steps or functions of the present invention.

For the sake of illustration, embodiments are described herein in the context and terminology of 3GPP LTE Advanced. However, it should be understood the present invention is not limited to 3GPP LTE Advanced, but rather can be applied to any kind of wireless communication system employing mechanisms which attempt to maximize the energy efficiency of the system and which use mobility management mechanisms.

Figure 1:
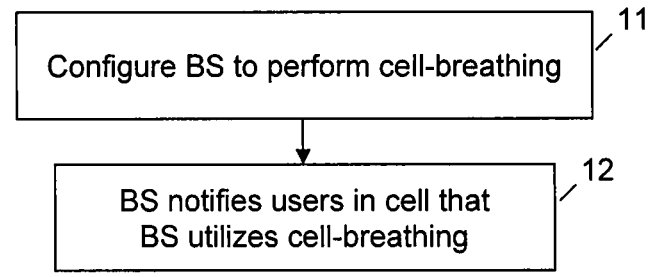
FIG. 1 is a flow chart illustrating the steps of a first exemplary embodiment of the method of the present invention.

FIG. 1 is a flow chart illustrating the steps of a first exemplary embodiment of the method of the present invention. In this embodiment, a base station is configured at step 11 to perform cell-breathing or a similar energy-efficiency mechanism. At step 12, the base station notifies users in the cell, either via broadcasting or with direct over-the-air signaling, that the base station utilizes such a mechanism within the cell. In a particular embodiment, the base station may transmit specific transmission patterns for its pilot symbols (such as Cell-specific Reference Symbols (CRSs) in LTE Advanced), which make the patterns distinguishable and traceable by UEs.

Figure 2:
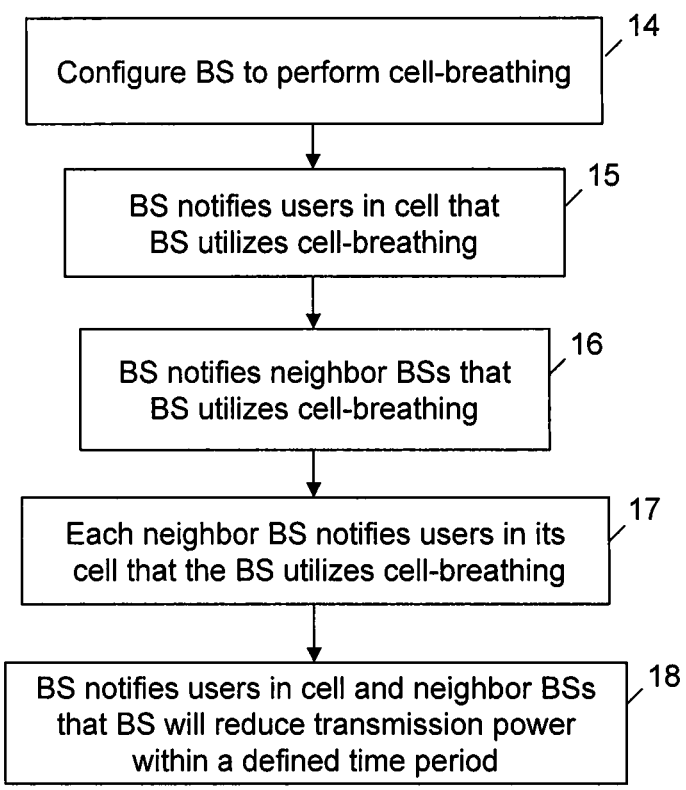
FIG. 2 is a flow chart illustrating the steps of a second exemplary embodiment of the method of the present invention.

FIG. 2 is a flow chart illustrating the steps of a second exemplary embodiment of the method of the present invention. In this embodiment, the base station is configured at step 14 to perform cell-breathing or a similar energy-efficiency mechanism. At step 15, the base station notifies users in the cell, either via broadcasting or with direct over-the-air signaling, that the base station utilizes such a mechanism within the cell. At step 16, the base station may notify neighbor base stations that the base station utilizes energy-efficiency mechanisms such as cell-breathing. At step 17, the neighbor base stations disseminate this information to UEs within their own cells. It should be noted that any neighbor base stations utilizing an energy-efficiency mechanism such as cell-breathing also notify users within their own cells that the neighbor base stations themselves perform cell-breathing or a similar energy-efficiency mechanism. In a particular embodiment shown in step 18, the base station employing the energy-efficiency mechanism may inform UEs in its cell and neighbor base stations of the base station's intent to switch off its operation or reduce its transmission power within a defined time period. This information may be provided to UEs, for example, either with a specific pattern used for the pilot transmission or via explicit over the air signaling. The information may be provided to neighbor base stations directly via X2 signaling, via a Base Station Controller (BSC), via S1 signaling, or other routing.

UEs in the cell may consider this information when performing cell reselection to neighbor cells or when they listen to CRSs of a neighbor cell with this specific pattern. UEs in idle mode may perform cell reselection by applying a specific weighting factor for the neighbor cells that perform cell-breathing or similar energy-efficiency techniques. For example, based on the cell reselection formula described in TS 36.304, the formula for deciding whether to reselect a target cell is modified in this case as follows:

$$\alpha \cdot RSRP_{Target} > RSRP_{Serving} + Q_{Hysteresis} + CellOffset, \quad (1)$$

where $\alpha$ is a weighting factor between 0 and 1; $RSRP_{Target}$ is the Reference Signal Received Power from the target cell; $RSRP_{Serving}$ is the Reference Signal Received Power from the serving cell; $Q_{Hysteresis}$ is a hysteresis amount to prevent oscillating reselections; and CellOffset is a cell-specific offset.

As an example, when a given target base station is about to shut down or reduce power of its transmitters and receivers, $\alpha$ may take a value allowing $\alpha$ to approach 0 (for example, $0 < \alpha < 0.75$) so that the UE is less likely to select to camp on that base station. At another time instant, when this target base station is fully active and not scheduled to shut down or reduce power of its transmitters and receivers anytime soon, $\alpha$ may take a value allowing $\alpha$ to approach 1 (for example, $0.25 < \alpha < 1$), making it more likely that the UE will select the base station, although not as likely as if the target base station did not perform cell-breathing or a similar energy-efficiency technique.

Alternatively, UEs that are in idle mode may perform cell reselection by adding a new specific offset for the neighbor cells that perform cell-breathing or similar energy-efficiency techniques. For example, based on the cell reselection formula described in TS 36.304, the formula for deciding whether to reselect a target cell is modified in this case as follows:

$$RSRP_{Target} > RSRP_{Serving} + Q_{Hysteresis} + CellOffset + NewOffset, \quad (2)$$

where NewOffset is the new cell-specific offset added due to the target base station employing cell-breathing or a similar energy-efficiency technique. The value of NewOffset can change over time for the same target cell, depending on the state of activity of this designated cell.

FIG. 3 is a flow chart illustrating the steps of a third exemplary embodiment of the method of the present invention. In this embodiment, the base station is configured at step 21 to perform cell-breathing or a similar energy-efficiency mechanism. At step 22, the base station notifies neighbor base stations that the base station utilizes energy-efficiency mechanisms such as cell-breathing. This information may be provided to neighbor base stations directly via X2 signaling, via a Base Station Controller (BSC), via S1 signaling, or other routing.

FIG. 4 is a flow chart illustrating the steps of a fourth exemplary embodiment of the method of the present invention. In this embodiment, the base station is configured at step 23 to perform cell-breathing or a similar energy-efficiency mechanism. At step 24, the base station notifies neighbor base stations that the base station utilizes energy-efficiency mechanisms such as cell-breathing. At step 25, all of the neighbor base stations that perform cell-breathing or a similar energy-efficiency mechanism notify the base station (and their users) that they perform cell-breathing or a similar energy-efficiency mechanism. At step 26, the base station receives measurement reports from a user terminal such as a UE indicating a measured handover-decision criterion (such as for example, received signal power) from a given neighbor base station higher than the received signal power from the base station plus a normal handover threshold. At step 27, the base station determines whether the given neighbor base station is one that utilizes cell-breathing or a similar energy-efficiency mechanism. If not, the method moves to step 28 where the base station initiates handover of the user terminal to the given neighbor base station using normal procedures. If the given neighbor base station is one that utilizes cell-breathing or a similar energy-efficiency mechanism, the method moves to step 29 where the base station initiates handover only if the received signal power from the given neighbor base station exceeds the received signal power from the base station by the normal handover threshold plus an additional threshold amount.

The additional threshold amount of required signal power may be determined by applying a cell-specific weighting factor $\beta$ to measurement reports for neighbor base stations that perform cell-breathing or a similar energy-efficiency mechanism. Alternatively, the additional amount of required signal power may be determined by requiring the measurement report for the given neighbor base station to meet an additional cell-specific offset, NewOffset2.

As an example of the cell-specific weighting factor $\beta$, if the neighbor cell is employing cell-breathing or a similar energy-efficiency technique, a handover decision may be based on:

$$\beta \cdot RSRP_{Target} > RSRP_{Serving} + HO_{Hysteresis} + CellSpecificOffset, \quad (3)$$

where $\beta$ is a weighting factor between 0 and 1; HOHysteresis is a hysteresis amount to prevent oscillating handovers; and CellSpecificOffset is a cell-specific offset, whose value can be defined by various parameters such as the network topology, or the desired load in the cell, etc. The weighting factor $\beta$ may exhibit the same characteristics between 0 and 1 as the weighting factor $\alpha$ described above.

As an example of the new cell-specific offset, NewOffset2, if the neighbor cell is employing cell-breathing or a similar energy-efficiency technique, a handover decision may be based on:

$$RSRP_{Target} > RSRP_{Serving} + HO_{Hysteresis} + CellOffset + NewOffset2 \quad (4)$$

where NewOffset2 is the new cell-specific offset added due to the target base station employing cell-breathing or a similar energy-efficiency technique.

Figure 5:
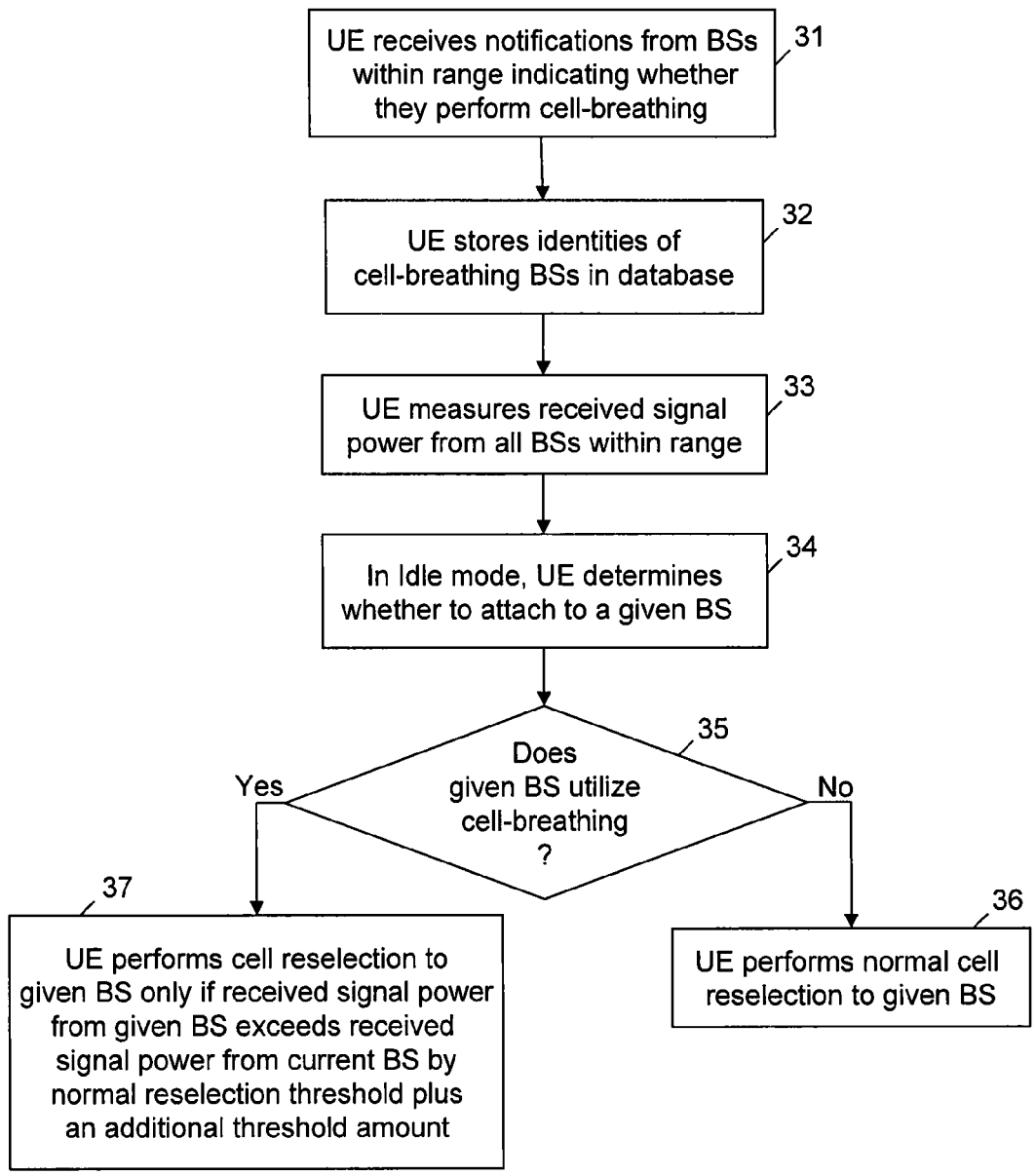
FIG. 5 is a flow chart illustrating the steps of a fifth exemplary embodiment of the method of the present invention.
Figure 7:
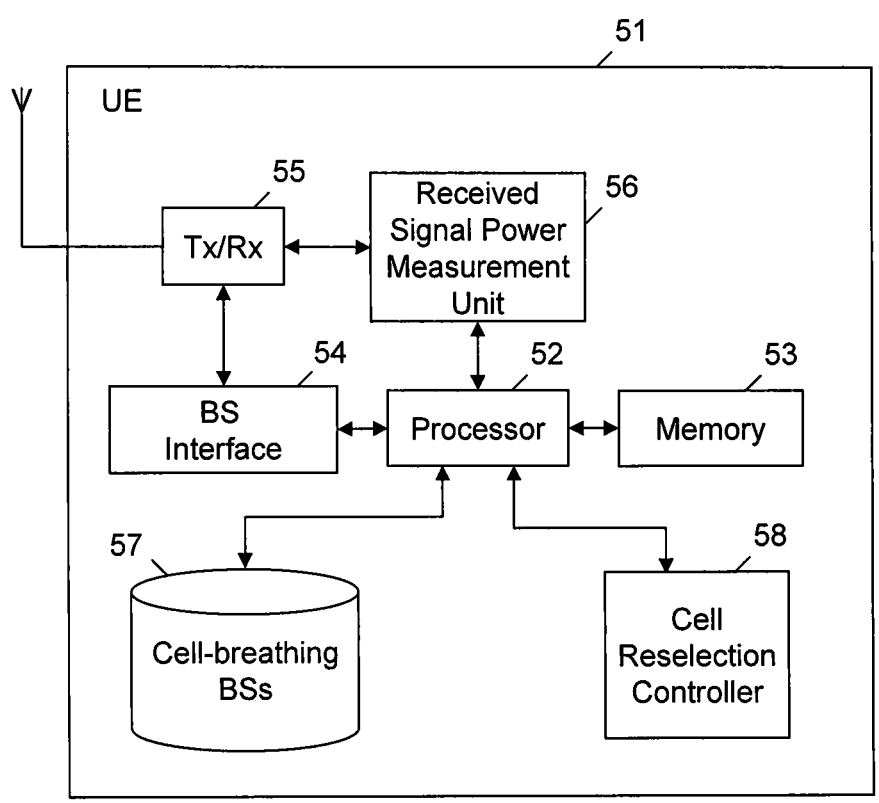
FIG. 7 is a simplified block diagram of an exemplary embodiment of a User Equipment (UE) of the present invention.

FIG. 5 is a flow chart illustrating the steps of a fifth exemplary embodiment of the method of the present invention. This embodiment is performed by a UE 51 (FIG. 7). At step 31, the UE receives notifications from base stations within range indicating whether the base stations utilize energy-efficiency mechanisms such as cell-breathing. At step 32, the UE stores in a database, the identities of the cell-breathing base stations. At step 33, the UE measures received signal power from all of the base stations within range. At step 34, when in Idle mode, the UE determines whether to attach to a particular base station. If it is determined at step 35 that the particular base station is not capable of performing the cell-breathing operation, the method moves to step 36 where the UE performs cell reselection to the particular base station using normal procedures. If the particular base station is one that utilizes cell-breathing or a similar energy-efficiency mechanism, the method moves to step 37 where the UE initiates cell reselection to the particular base station only if a measured cell reselection criterion (such as for example, received signal power) from the particular base station exceeds the received signal power from the base station where the UE is currently attached by the normal reselection threshold plus an additional threshold amount.

Figure 6:
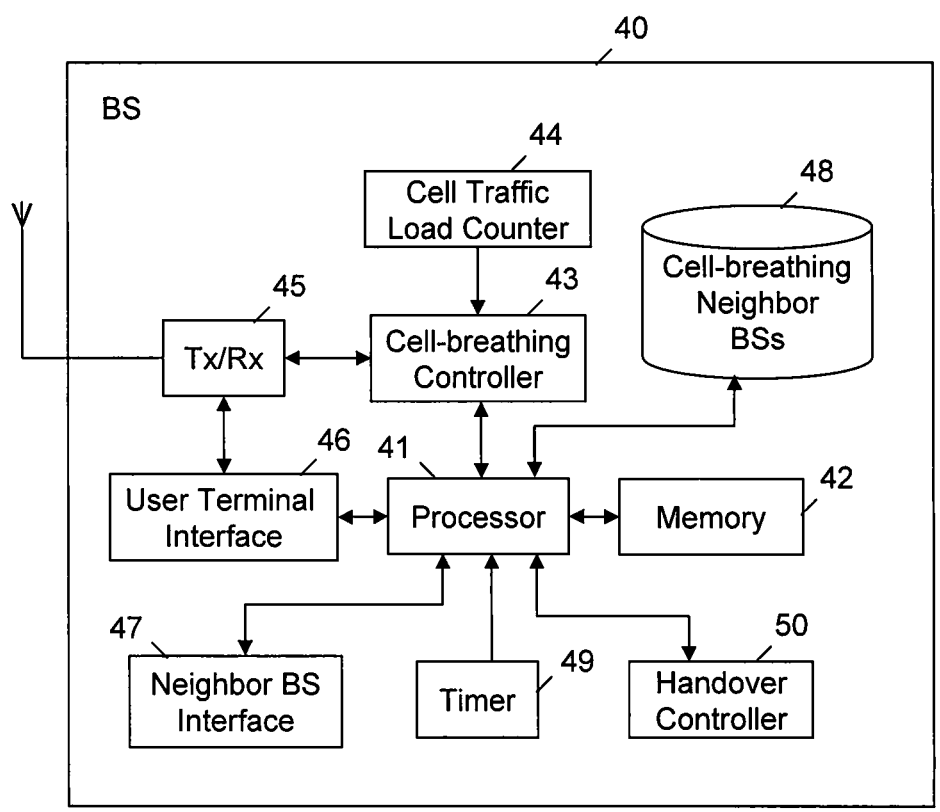
FIG. 6 is a simplified block diagram of an exemplary embodiment of a base station of the present invention.

FIG. 6 is a simplified block diagram of an exemplary embodiment of a base station 40 of the present invention. In one embodiment, operation of the base station is controlled by a processor 41 executing computer program instructions stored in a non-transitory memory 42. The processor interfaces with a cell-breathing controller 43, which receives reports from a cell traffic load counter 44. When the traffic load in the cell begins to exceed the capacity of the base station, the cell-breathing controller causes a transceiver (TX/Rx) 45 to reduce its transmitter power to force UEs operating near the cell border to handoff to neighboring cells, thus reducing the load on the base station. Through a user terminal interface 46, the base station notifies UEs operating within range that the base station performs the cell-breathing operation. Through a neighbor base station interface 47, the base station notifies neighbor base stations that the base station is capable of performing the cell-breathing operation. The neighbor base station interface may also receive reports from the neighbor base stations indicating whether they perform the cell-breathing operation. Identities of the cell-breathing neighbor base stations may be stored in a database 48. A timer 49 enables the base station to provide UEs and/or neighbor base stations with advanced warning that the base station will reduce its transmission power within a defined time period. A handover controller 50 determines whether a given target neighbor base station is one that utilizes cell-breathing or a similar energy-efficiency mechanism. If not, the handover controller initiates handover of the user terminal to the given target neighbor base station using normal procedures. If the given target neighbor base station is one that utilizes cell-breathing or a similar energy-efficiency mechanism, the handover controller initiates handover only if the received signal power from the given target neighbor base station exceeds the received signal power from the base station by the normal handover threshold plus an additional threshold amount.

FIG. 7 is a simplified block diagram of an exemplary embodiment of a UE 51 of the present invention. In one embodiment, operation of the UE is controlled by a processor 52 executing computer program instructions stored in a non-transitory memory 53. A base station interface 54 is utilized for sending uplink messages to a serving base station and receiving downlink messages from the serving base station through the transceiver (Tx/Rx) 55. A received signal power measurement unit 56 measures the received signal power of radio signals received from the serving base station and other neighbor base stations. The UE reports the received signal power measurements to the serving base station.

The UE also includes a database 57 of cell-breathing base stations, which identifies those base stations that have notified the UE that they perform the cell-breathing operation or a similar energy-efficiency mechanism. This information is useful, for example, when a cell reselection controller 58 makes a determination of whether to camp on a given base station when the UE is in Idle mode. If the given base station does not perform the cell-breathing operation, the cell reselection controller performs cell reselection to the given base station using normal procedures. If the given base station is one that utilizes cell-breathing or a similar energy-efficiency mechanism, the cell reselection controller initiates cell reselection to the given base station only if the received signal power from the given base station exceeds the received signal power from the base station where the UE is currently attached by the normal reselection threshold plus an additional threshold amount.

In this way, particular embodiments of the present invention enable energy-efficiency mechanisms such as cell-breathing to be utilized in a cellular network without generating connection losses, reduced quality of service, or any other disruption/degradation of service to the users as a result of mobility management decisions such as cell reselection and handover.

As will be recognized by those skilled in the art, the innovative concepts described in the present application can be modified and varied over a wide range of applications. Accordingly, the scope of patented subject matter should not be limited to any of the specific exemplary teachings discussed above, but is instead defined by the following claims.

What is claimed is:

1. A base station in a cellular telecommunication network, comprising:
   a transceiver configured to transmit and receive radio signals with User Equipments (UEs) operating in a cell associated with the base station; and
   a processor coupled to a non-transitory memory that stores computer program instructions, wherein when the processor executes the computer program instructions, the base station is caused to:
   perform a power-efficiency procedure by reducing transmit power of the transceiver when a traffic load in the cell falls below a threshold level;
   notify the UEs operating in the cell that the base station is capable of performing the power-efficiency procedure;
   notify neighbor base stations that the base station is capable of performing the power-efficiency procedure;
   determine whether a given one of the neighbor base stations is capable of performing the power-efficiency procedure; and
   require that a UE requesting handover to the given neighbor base station report a measured handover-decision criterion from the given neighbor base station that exceeds the measured handover-decision criterion of the base station by a normal handover threshold plus an additional threshold amount.

2. The base station as recited in claim 1, wherein the base station is configured to notify the UEs operating in the cell that the base station is capable of performing the power-efficiency procedure by including a specific transmission pattern in pilot symbols transmitted by the base station.

3. The base station as recited in claim 2, wherein the cellular telecommunication network is a Long Term Evolution (LTE) Advanced network, and the pilot symbols are Cell-specific Reference Symbols (CRSs).

4. The base station as recited in claim 1, wherein the base station is configured to notify the neighbor base stations and the UEs operating in the cell when the base station is within a specified time period of reducing the transmission power.

5. The base station as recited in claim 4, wherein the base station communicates with the neighbor base stations by one of an X2 signaling interface, pilot symbol transmissions, and explicit radio signals directed to the neighbor base stations.

6. The base station as recited in claim 1, wherein the base station is configured to compute the additional threshold amount by applying a cell-specific weighting factor $\beta$ to the reported measured handover-decision criterion from the given neighbor base station, wherein the weighting factor is $0<\beta<1$.

7. The base station as recited in claim 6, wherein the given neighbor base station reports to the base station when the given neighbor base station is within a specified time period of reducing its transmission power, and the base station is configured to assign to the cell-specific weighting factor $\beta$, a value greater than 0 and less than 0.75 when the given neighbor base station is within the specified time period of reducing its transmission power.

8. The base station as recited in claim 6, wherein the given neighbor base station reports to the base station when the given neighbor base station is within a specified time period of reducing its transmission power, and the base station is configured to assign to the cell-specific weighting factor $\beta$, a value greater than 0.25 and less than 1 when the given neighbor base station is not within the specified time period of reducing its transmission power.

9. The base station as recited in claim 1, wherein the base station is configured to require that the measured handover-decision criterion from the given neighbor base station exceed by an additional offset value, a normal handover-decision criterion that would be required if the given neighbor base station was not capable of performing the power-efficiency procedure.

10. A base station in a cellular telecommunication network, comprising:
    a transceiver configured to transmit and receive radio signals with User Equipments (UEs) operating in a cell associated with the base station; and
    a processor coupled to a non-transitory memory that stores computer program instructions, wherein when the processor executes the computer program instructions, the base station is caused to:
        perform a power-efficiency procedure by reducing transmit power of the transceiver when a traffic load in the cell falls below a threshold level;
        notify neighbor base stations that the base station is capable of performing the power-efficiency procedure;
        determine whether a given one of the neighbor base stations is capable of performing the power-efficiency procedure; and
        require that a UE requesting handover to the given neighbor base station report a measured handover-decision criterion from the given neighbor base station that exceeds the measured handover-decision criterion of the base station by a normal handover threshold plus an additional threshold amount.

11. A User Equipment (UE) in a cellular telecommunication network, wherein the UE is in idle mode and is attached to a first cell served by a first base station, the UE comprising:
    a transceiver configured to transmit and receive radio signals with base stations in the cellular telecommunication network;
    a processor coupled to a non-transitory memory that stores computer program instructions, wherein when the processor executes the computer program instructions, the UE is caused to:
        perform measurements of a cell reselection criterion from the first base station and from neighbor base stations;
        determine that a given neighbor base station serving a given neighbor cell has a measured cell reselection criterion higher than the measured cell reselection criterion from the first base station plus a reselection offset amount;
        determine whether the given neighbor base station is capable of performing a power-efficiency procedure in which the given neighbor base station reduces a transmit power of its transceiver when a traffic load in the given neighbor cell falls below a threshold level; and
        upon determining that the given neighbor base station is capable of performing the power-efficiency procedure, perform a cell reselection procedure to attach to the given neighbor cell only if the measured cell reselection criterion from the given neighbor base station exceeds the measured cell reselection criterion from the first base station plus the reselection offset amount plus an additional threshold amount.

12. The UE as recited in claim 11, wherein the UE is configured to determine whether the given neighbor base station is capable of performing the power-efficiency procedure by receiving a specific transmission pattern in pilot symbols transmitted by either the first base station or the given neighbor base station.

13. The UE as recited in claim 12, wherein the cellular telecommunication network is a Long Term Evolution (LTE) Advanced network, and the pilot symbols are Cell-specific Reference Symbols (CRSs).

14. The UE as recited in claim 11, wherein the UE is configured to receive a notification from the given neighbor base station when the given neighbor base station is within a specified time period of reducing the transmission power.

15. The UE as recited in claim 11, wherein the UE is configured to compute the additional threshold amount by applying a cell-specific weighting factor $\alpha$ to the measured cell reselection criterion from the given neighbor base station, wherein the weighting factor is $0<\alpha<1$.

16. The UE as recited in claim 15, wherein the given neighbor base station reports to the UE when the given neighbor base station is within a specified time period of reducing its transmission power, and the UE is configured to assign to the cell-specific weighting factor $\alpha$, a value greater than 0 and less than 0.75 when the given neighbor base station is within the specified time period of reducing its transmission power.

17. The UE as recited in claim 15, wherein the given neighbor base station reports to the UE when the given neighbor base station is within a specified time period of reducing its transmission power, and the UE is configured to assign to the cell-specific weighting factor $\alpha$, a value greater than 0.25 and less than 1 when the given neighbor base station is not within the specified time period of reducing its transmission power.

18. The UE as recited in claim 11, wherein the UE is configured to require that the measured cell reselection criterion from the given neighbor base station exceed by an additional offset value, the normal cell reselection criterion that would be required if the given neighbor base station were not capable of performing the power-efficiency procedure.

19. A method performed in a base station in a cellular telecommunication network, the base station having a transceiver configured to transmit and receive radio signals with User Equipments (UEs) operating in a cell associated with the base station, the method comprising the steps of:
- performing a power-efficiency procedure by reducing transmit power of the transceiver when a traffic load in the cell falls below a threshold level; and
- notifying the UEs operating in the cell that the base station is capable of performing the power-efficiency procedure;
- notifying neighbor base stations that the base station is capable of performing the power-efficiency procedure;
- determining whether a given one of the neighbor base stations is capable of performing the power-efficiency procedure; and
- requiring that a UE requesting handover to the given neighbor base station report a measured handover-decision criterion from the given neighbor base station that is higher than a normal measured handover-decision criterion that would be required if the given neighbor base station was not capable of performing the power-efficiency procedure.

20. The method as recited in claim 19, further comprising notifying the neighbor base stations when the base station is within a specified time period of reducing the transmission power.

21. A method performed by a User Equipment (UE) in Idle mode while attached to a first cell served by a first base station in a cellular telecommunication network, wherein the UE is capable of performing measurements of a cell reselection criterion from the first base station and from neighbor base stations, and determines that a given neighbor base station serving a given neighbor cell has a measured cell reselection criterion higher than the measured cell reselection criterion from the first base station plus a reselection offset amount, the method comprising the steps of:
- receiving from the neighbor base stations, notifications indicating whether each neighbor base station is capable of performing a power-efficiency procedure in which the neighbor base station reduces a transmit power of its transceiver when a traffic load in the neighbor cell falls below a threshold level;
- storing the notifications in a database;
- determining from the database whether the given neighbor base station is capable of performing the power-efficiency procedure;
- when the given neighbor base station is not capable of performing the power-efficiency procedure, performing a normal cell reselection procedure to attach to the given neighbor cell; and
- when the given neighbor base station is capable of performing the power-efficiency procedure, performing a cell reselection procedure to attach to the given neighbor cell only if the measured cell reselection criterion from the given neighbor base station exceeds the measured cell reselection criterion from the first base station plus the reselection offset amount plus an additional threshold amount.

* * * * *

UNITED STATES PATENT AND TRADEMARK OFFICE
CERTIFICATE OF CORRECTION

PATENT NO. : 9,084,117 B2
APPLICATION NO. : 13/541134
DATED : July 14, 2015
INVENTOR(S) : Dimou Page 1 of 1

It is certified that error appears in the above-identified patent and that said Letters Patent is hereby corrected as shown below:

In The Claims

In Column 11, Line 14, in Claim 19, delete "level; and" and insert -- level; --, therefor.

Signed and Sealed this
First Day of March, 2016

Michelle K. Lee
*Director of the United States Patent and Trademark Office*